United States Patent Office 2,734,068
Patented Feb. 7, 1956

2,734,068

SULFONYLOXY ESTERS OF β-AMINOALCOHOLS

Theodore A. Geissman, Los Angeles, Calif., assignor to Smith, Kline & French Laboratories, Philadelphia, Pa., a corporation of Pennsylvania No Drawing. Application September 22, 1950,
Serial No. 186,317

9 Claims. (Cl. 260—456)

This invention relates to new chemical compounds, more particularly to sulfonic acid esters of β-aminoalcohols.

The compounds of this invention possess physiological activity; more particularly they will be useful as sympatholytic agents.

The compounds of this invention, from the broad stand-point, have the following structure:

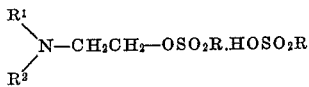

in which:

$R^1$ is selected from the group consisting of aralkyl, the alkyl portion of which contains not more than 3 carbon atoms; and aralkyl, the alkyl portion of which contains not more than 3 carbon atoms, and substituted in the aryl nucleus with a substituent selected from the group consisting of methyl, methoxy and halogen.

$R^2$ is selected from the group consisting of lower alkyl, benzyl and benzyl substituted in the phenyl nucleus with a substituent selected from the group consisting of methyl, methoxy and halogen.

R is selected from the group consisting of lower alkyl; phenyl; phenyl substituted with a substituent selected from the group consisting of methyl, methoxy and halogen; and naphthyl.

More specifically, the compounds according to this invention will have the following structure:

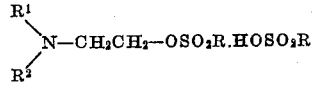

in which:

$R^1$ is selected from the group consisting of phenyl alkyl, the alkyl portion of which contains not more than 3 carbon atoms; phenyl alkyl, the alkyl portion of which contains not more than 3 carbon atoms and substituted in the phenyl nucleus with a substituent selected from the group consisting of methyl, methoxy, chlorine and bromine; and α-naphthylmethyl.

$R^2$ is selected from the group consisting of lower alkyl, benzyl and benzyl substituted in the phenyl nucleus with a substituent selected from the group consisting of methyl, methoxy, chlorine and bromine.

R is selected from the group consisting of lower alkyl; phenyl; phenyl substituted with a substituent selected from the group consisting of methyl, methoxy, chlorine and bromine; and β-naphthyl.

The compounds according to this invention will be prepared, preferably, by reacting the silver salts of sulfonic acid with a halogen derivative, prepared by treating a β-amino alcohol with thionyl halides to form the corresponding sulfonic acid ester in the form of the salt of the sulfonic acid. This method of preparation is illustrated by the reaction shown below, the values for R, $R^1$ and $R^2$ being as given above and X representing a halogen atom:

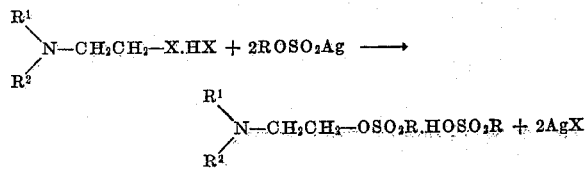

In some cases it may be advantageous to employ a β-iodoethylamine to react with the silver sulfonate. The β-iodo compound is prepared by treating the corresponding β-chloroethylamine prepared above with sodium iodide in acetone solution.

Alternately, the compounds according to this invention may be prepared by the direct reaction of the β-aminoalcohol with the sulfonic acid itself, which reaction is illustrated by the following, the values of R, $R^1$ and $R^2$ being as given above:

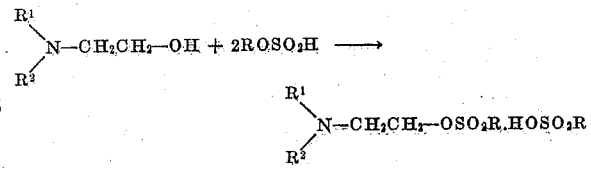

The compounds according to this invention and procedure for their preparation will be further illustrated by the following specific examples:

EXAMPLE 1

*Dibenzyl-β-benzenesulfonyloxyethylamine benzenesulfonate*

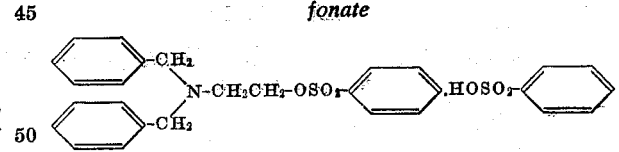

A mixture of 18 g. of dibenzyl-β-chlorethylamine hydrochloride and 70 g. of silver benzenesulfonate was refluxed overnight in 200 ml. of dry acetone. The hot solution was filtered through celite and the filter cake was washed several successive times with small portions of acetone. The resulting clear solution was concentrated and dry ether added until turbidity was noticed. The product separated in crystalline form upon cooling and was recrystallized from acetone by the addition of dry ether to yield a product melting at 119–120.5°.

EXAMPLE 2

*Dibenzyl-β-(p-toluenesulfonyloxy)-ethylamine p-toluenesulfonate*

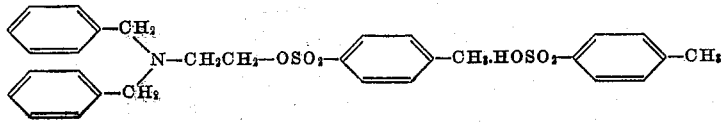

20 g. of dibenzyl-β-chloroethylamine hydrochloride and 60 g. of silver p-toluenesulfonate in 200 ml. of dry acetone was treated in a manner identical with that described in Example 1 above. The ester product upon recrystallization melted at 144–146°.

EXAMPLE 3

*Dibenzyl-β-(β-naphthalenesulfonyloxy)-ethylamine β-naphthylsulfonate*

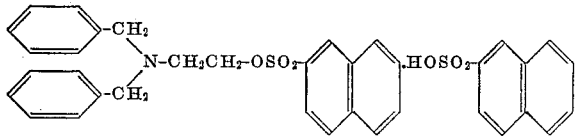

2 g. of dibenzyl-β-chloroethylamine hydrochloride and 5 g. of silver β-naphthalenesulfonate were refluxed in 50 ml. of dry methylethyl ketone, and the product isolated as described in Example 1 above. The β-naphthylsulfonic salt of the ester so obtained melted at 125–127° C. after two recrystallizations from acetone. Analysis of this product disclosed the compound to contain one molecule of acetone of crystallization.

EXAMPLE 4

*Dibenzyl-β-(p-bromobenzenesulfonyloxy)-ethylamine p-bromobenzenesulfonate*

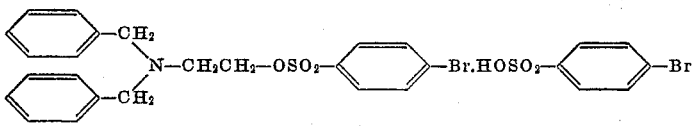

40 g. of silver p-bromobenzenesulfonate and 10 g. of dibenzyl-β-chloroethylamine hydrochloride was covered with 200 ml. of anhydrous acetone and refluxed for 48 hours with constant mechanical stirring. The mixture while still hot was then filtered through a small Buchner funnel and the residue was washed with acetone. Upon the addition of dry ether to the concentrated filtrate there appeared a turbidity. Cooling separated an oil which, upon redissolving in dry, hot acetone, was caused to crystallize by the addition of further dry ether. The white crystalline product melted at 107–110° C.

EXAMPLE 5

*Ethyl-α-naphthylmethyl-β-(p-toluenesulfonyloxy)-ethylamine p-toluenesulfonate*

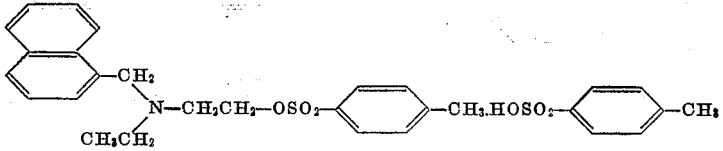

A mixture of 13 g. of α-napthylmethyl-ethyl-β-iodoethylamine hydroiodide and 18 g. of silver p-toluenesulfonate was refluxed with stirring for 48 hours in 200 ml. of dry methylethyl ketone. Upon removal of the silver iodide by filtration the product was precipitated as an oil by the addition of ether. Reprecipitation and recrystallization of the product from acetone and ether provided a product melting at 103.5–105°.

The α-naphthylmethyl-ethyl-β-iodoethylamine hydroiodide used as a starting material above, was prepared from the corresponding β-chloro compound. A solution of 5 gm. of α-naphthylmethyl-ethyl-β-chloroethylamine hydrochloride and 7.6 gm. of sodium iodide in 150 ml. of acetone was refluxed for 16.5 hours. The solid was filtered and was found to contain most of the iodo compound. The acetone solution was concentrated to 50 ml., cooled, and the crystals that deposited were filtered. The combined solid fractions were recrystallized from absolute ethanol to yield light yellow crystals melting at 166.5–167° (d).

EXAMPLE 6

*Dibenzyl-β-methylsulfonyloxyethylamine methylsulfonate*

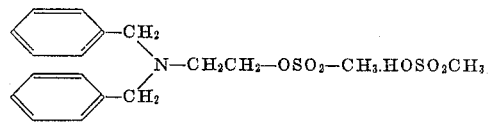

This compound will be prepared using a procedure identical with that described in Example 1, with the exception that silver methylsulfonate will be used in place of silver benzenesulfonate.

EXAMPLE 7

*Dibenzyl-β-(n-propylsulfonyloxy)-ethylamine n-propylsulfonate*

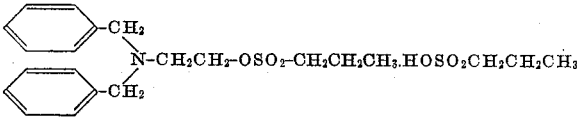

This compound will be prepared using a procedure identical with that described in Example 1, with the exception that silver n-propylsulfonate will be used in place of silver benzenesulfonate.

EXAMPLE 8

*Phenylethyl-benzyl-β-(p-methoxybenzenesulfonyloxy)-ethylamine p-methoxybenzensulfonate*

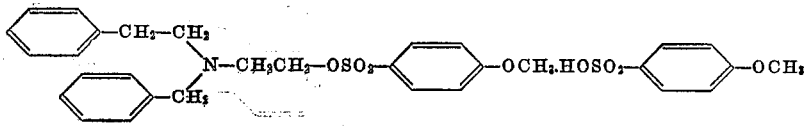

This compound will be prepared according to the procedure described in Example 1, with the exception that dibenzyl-β-chloroethylamine will be replaced by phenylethylbenzyl-β-chloroethylamine will be replaced by phenylethylbenzyl-β-chloroethylamine hydrochloride, and silver benzenesulfonate will be replaced by silver p-methoxybenzenesulfonate.

EXAMPLE 9

*Di-(p-tolylmethyl)-β-benzenesulfonyloxyethylamine benzenesulfonate*

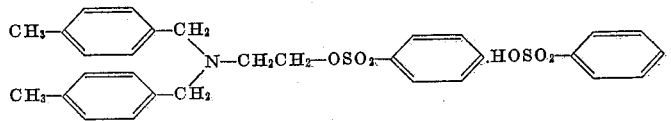

This compound will be prepared using a procedure identical with that described in Example 1, with the exception that di-(p-tolylmethyl)-β-chloroethylamine hydrochloride will be used in place of dibenzyl-β-chloroethylamine.

EXAMPLE 10

*Di-(p-methoxybenzyl)-β-(p-chlorobenzenesulfonyloxy)-ethylamine p-chlorobenzenesulfonate*

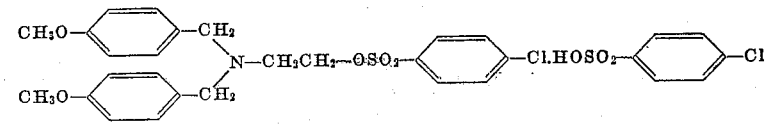

This compound will be prepared according to the procedure described in Example 1, with the exception that dibenzyl-β-chloroethylamine will be replaced by di-(p-methoxybenzyl)-β-chloroethylamine hydrochloride, and silver benzenesulfonate will be replaced by silver p-chlorobenzenesulfonate.

EXAMPLE 11

*Di-(n-chlorobenzyl)-β-(p-bromobenzenesulfonyloxy)-ethylamine p-bromobenzenesulfonate*

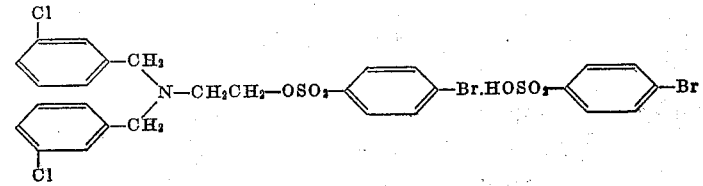

This compound will be prepared according to the procedure described in Example 1, with the exception that dibenzyl-β-chlorethylamine will be replaced by di-(m-chlorobenzyl)-β-chlorethylamine hydrochloride, and silver benzenesulfonate will be replaced by silver p-bromobenzenesulfonate.

EXAMPLE 12

*Phenylisopropyl-benzyl-β-(p-toluenesulfonyloxy)-ethylamine p-toluenesulfonate*

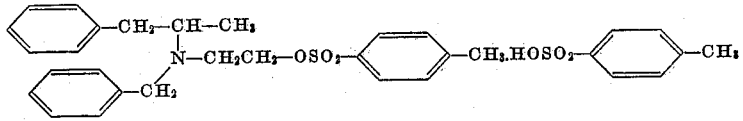

This compound will be prepared according to the procedure described in Example 1, with the exception that dibenzyl-β-chloroethylamine will be replaced by phenylisopropyl-benzyl-β-chloroethylamine hydrochloride, and silver benzenesulfonate will be replaced by silver p-toluenesulfonate.

EXAMPLE 13

*Benzyl-(3,4-dimethoxyphenylisopropyl)-β-benzenesulfonyloxyethylamine benzenesulfonate*

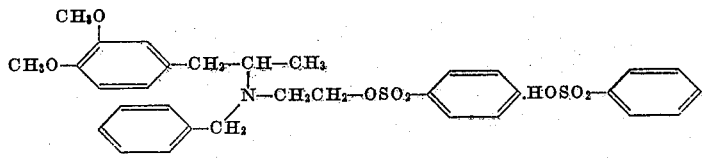

This compound will be prepared according to the procedure described in Example 1, with the exception that dibenzyl-β-chloroethylamine will be replaced by benzyl-(3,4-dimethoxyphenylisopropyl)-β-chloroethylamine hydrochloride.

EXAMPLE 14

*Isobutyl-phenylisopropyl-β-(β'-naphthalenesulfonyloxy)-ethylamine β'-naphthalenesulfonate*

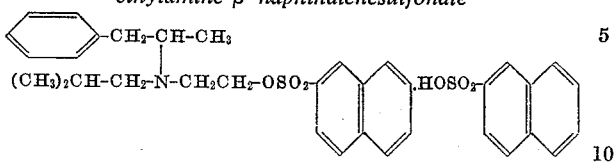

This compound will be prepared according to the procedure described in Example 1, with the exception that dibenzyl-β-chloroethylamine will be replaced by isobutyl-phenylisopropyl-β-chloroethylamine hydrochloride, and silver benzenesulfonate will be replaced by silver β-naphthalenesulfonate.

EXAMPLE 15

*n-Heptyl-benzyl-β-benzenesulfonyloxyethylamine benzenesulfonate*

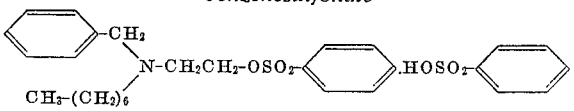

This compound will be prepared according to the procedure described in Example 1, with the exception that dibenzyl-β-chloroethylamine will be replaced by n-heptyl-benzyl-β-chloroethylamine hydrochloride.

EXAMPLE 16

*Ethyl-m-chlorobenzyl-β-benzenesulfonyloxyethylamine benzenesulfonate*

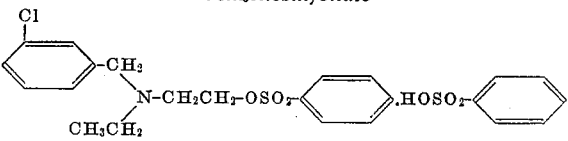

This compound will be prepared according to the procedure described in Example 1, with the exception that dibenzyl-β-chloroethylamine will be replaced by ethyl-m-chlorobenzyl-β-chloroethylamine hydrochloride.

EXAMPLE 17

*Isopropyl-benzyl-β-ethylsulfonyloxyethylamine ethylsulfonate*

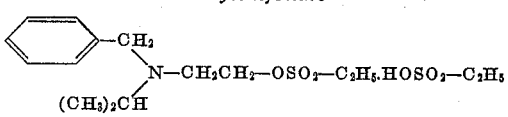

This compound will be prepared according to the procedure described in Example 1, with the exception that dibenzyl-β-chloroethylamine will be replaced by isopropyl-benzyl-β-chlorethylamine hydrochloride, and silver benzenesulfonate will be replaced by silver ethylsulfonate.

What is claimed is:

1. Sulfonyloxy esters of β-aminoalcohols having the structure:

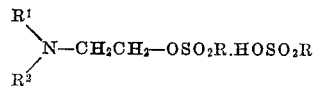

in which $R^1$ is selected from the group consisting of aralkyl, the alkyl portion of which contains not more than 3 carbon atoms; aralkyl having not more than 3 carbon atoms in the alkyl portion and substituted in the aryl nucleus with a methyl group; aralkyl having not more than 3 carbon atoms in the alkyl portion and substituted in the aryl nucleus with a methoxy group; aralkyl having not more than 3 carbon atoms in the alkyl portion and substituted in the aryl nucleus with a halogen atom; $R^2$ is selected from the group consisting of lower alkyl, benzyl, benzyl substituted in the phenyl nucleus with a methyl group; benzyl substituted in the phenyl nucleus with a methoxy group; benzyl substituted in the phenyl nucleus with a halogen atom; and R is selected from the group consisting of lower alkyl, naphthyl, phenyl, methyl substituted phenyl, methoxy substituted phenyl and halogen substituted phenyl.

2. The compound having the following formula:

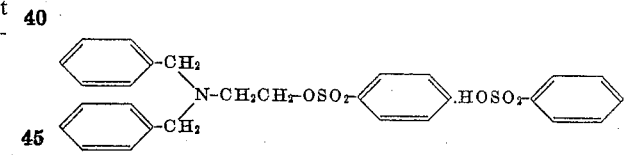

3. The compound having the following formula:

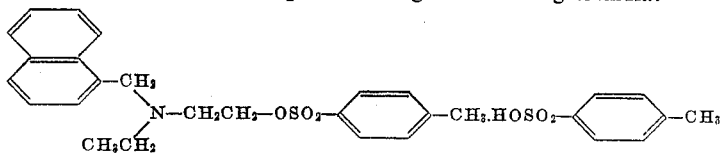

4. The compound having the following formula:

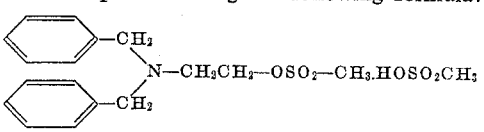

5. The compound having the following formula:

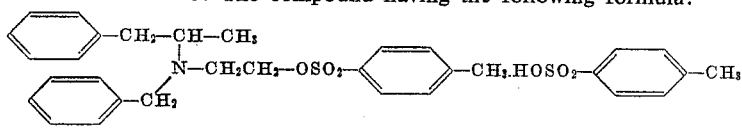

6. The compound having the following formula:

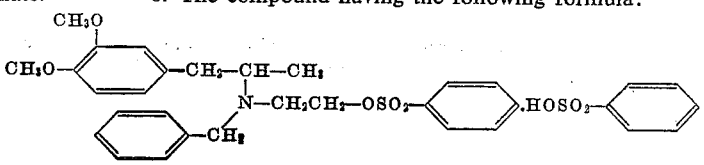

7. The compound having the following structure:

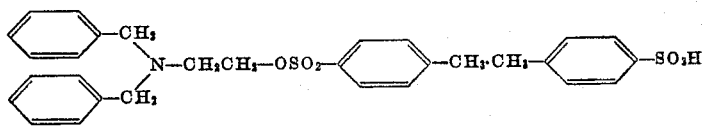

8. Sulfonyloxy esters of β-aminoalcohols having the structure:

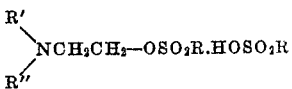

in which R' is aralkyl having a benzene ring which is linked to the nitrogen through at least one and no more than two aliphatic carbon atoms and having not in excess of three aliphatic carbon atoms; R" is selected from the group consisting of lower alkyl and benzyl; and R is selected from the group consisting of lower alkyl, phenyl and tolyl.

9. The process for obtaining a sulfonic acid ester of 2-dialkylamino-ethanols in which a compound of the class consisting of a free base and its hydrohalide addition, salts, the free base having the formula:

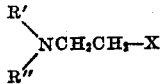

in which R' is aralkyl having a benzene ring which is linked to the nitrogen through at least one and no more than two aliphatic carbon atoms and having not in excess of three aliphatic carbon atoms; R" is selected from the group consisting of lower alkyl and benzyl; and in which X is a halogen; is mixed with a compound having the formula:

$$AgOSO_2R$$

in which R is selected from the group consisting of lower alkyl, phenyl and tolyl; in the presence of a non-hydroxylic solvent.

References Cited in the file of this patent

UNITED STATES PATENTS 2,504,977   Gump _____ Apr. 25, 1950